(12) United States Patent
Sawal et al.

(10) Patent No.: US 12,166,813 B1
(45) Date of Patent: Dec. 10, 2024

(54) SERVICE INSTANCE MANAGEMENT IN INFORMATION PROCESSING SYSTEM ENVIRONMENT

(71) Applicant: Dell Products L.P., Round Rock, TX (US)

(72) Inventors: Vinay Sawal, Fremont, CA (US); Sithiqu Shahul Hameed, Chennai (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/351,670

(22) Filed: Jul. 13, 2023

(51) Int. Cl.
*H04L 67/10* (2022.01)
*H04L 41/0806* (2022.01)
*H04L 41/40* (2022.01)

(52) U.S. Cl.
CPC .......... *H04L 67/10* (2013.01); *H04L 41/0806* (2013.01); *H04L 41/40* (2022.05)

(58) Field of Classification Search
None
See application file for complete search history.

(56) References Cited

U.S. PATENT DOCUMENTS

| | | | | |
|---|---|---|---|---|
| 2022/0006701 A1* | 1/2022 | Patel | ....................... | H04L 41/22 |
| 2022/0191063 A1* | 6/2022 | Sawal | ................. | G06F 16/9024 |

OTHER PUBLICATIONS

H. Mansur, "MX7000 Networking—Part 1: Introduction, Components," https://hasanmansur.com/2019/01/08/mx7000-networking-part-1-introduction-components/comment-page-1/, Jan. 8, 2019, 16 pages.
Dell EMC, "OpenManage Network Integration for SmartFabric Services User Guide," Release 2.1, Aug. 16, 2021, 163 pages.
Dell EMC, "VMware Integration for VxRail Fabric Automation SmartFabric User Guide," Release 1.1, Sep. 2019, 69 pages.
Dell EMC, "SmartFabric Services for OpenManage Network Integration User Guide," Release 1.3, Aug. 21, 2020, 155 pages.
Dell EMC, "OpenManage Network Integration for SmartFabric Services User Guide," Release 2.0, Dec. 2020, 191 pages.
Dell Technologies, "OpenManage Network Integration User Guide," Release 3.0, Jan. 2022, 158 pages.
Dell Technologies, "OpenManage Network Integration User Guide," Release 3.1, Jun. 27, 2022, 154 pages.
Dell Technologies, "OpenManage Network Integration User Guide," Release 3.2, Mar. 9, 2023, 165 pages.
Dell Technologies, "OpenManage Network Integration Security Configuration Guide," Apr. 28, 2023, 32 pages.

(Continued)

*Primary Examiner* — June Sison
(74) *Attorney, Agent, or Firm* — Ryan, Mason & Lewis, LLP

(57) ABSTRACT

Techniques for service instance management in an information processing system environment are disclosed. For example, a method comprises determining associations for first components of a virtual infrastructure platform and second components of a physical infrastructure platform. The method further comprises generating a graphical representation based on the associations for the first components and the second components. The method further comprises causing instantiation of one or more processing elements configured to perform at least one management function in accordance with at least one of the virtual infrastructure platform and the physical infrastructure platform, based on the graphical representation.

20 Claims, 11 Drawing Sheets

(56) References Cited

OTHER PUBLICATIONS

Dell EMC, "SmartFabric Services for OpenManage Network Integration User Guide," Release 1.2, Feb. 2020, 86 pages.
Dell Technologies, "OpenManage Network Integration User Guide," Release 3.3.1, Jul. 3, 2023, 161 pages.

* cited by examiner

400

| Service Endpoint | Service Endpoint | Affiliation Attribute | Affiliation Value | Method | Override (Disable)? |
|---|---|---|---|---|---|
| VC-1 | SFS-1 | MAC | 00:0a:95:9d:68:17 | Dynamic | No |
| SFS-4 | VC-2 | MAC | 00:0a:95:9d:68:16 | Dynamic | No |
| VC-2 | SFS-2 | MAC | 00:0a:95:9d:68:18 | Dynamic | No |
| VC-1 | SFS-3 | Asset Tag | 6XVHV | Pre-provisioned | No |
| SFS-5 | VC-3 | MAC | 00:0a:95:9d:68:19 | Dynamic | No |
| SFS-2 | VC-4 | Asset Tag | 7SHV6 | Pre-provisioned | Yes |
| VC-2 | SFS-1 | MAC | 00:0a:95:9d:68:20 | Dynamic | No |
| VC-3 | SFS-3 | MAC | 00:0a:95:9d:68:21 | Dynamic | No |
| SFS-2 | VC-3 | MAC | 00:0a:95:9d:68:01 | Dynamic | No |
| SFS-5 | SFS-6 | MAC | 00:0a:95:9d:68:23 | Dynamic | No |
| SFS7 | - | MAC | 00:0a:95:9d:68:24 | Dynamic | No |
| ... | ... | ... | ... | ... | ... |

FIG. 4

SERVICE INSTANCE MANAGEMENT IN INFORMATION PROCESSING SYSTEM ENVIRONMENT

FIELD

The field relates generally to information processing, and more particularly to techniques for managing information processing systems.

BACKGROUND

Enterprises are adopting the power of automation to transform their information technology (IT) operations. Such automation enables more agile and responsive infrastructure in the information processing systems utilized by enterprises. One example of an information processing system with such automation is a software defined data center (SDDC). SDDCs are data centers wherein infrastructure is virtualized through abstraction, resource pools, and various automation processes so as to enable provisioning and management of physical infrastructure. SDDCs utilize software-definable templates and application programming interfaces (APIs) to automate infrastructure configuration and operations.

While such automation provides many benefits, it is realized that the ability of an SDDC to effectively manage resources to maintain desired levels of service under varying workloads (e.g., scaling) can present significant challenges.

SUMMARY

Illustrative embodiments provide techniques for service instance management in an information processing system environment.

In one embodiment, an apparatus comprises at least one processing device comprising a processor coupled to a memory. The processing device is configured to determine associations for first components of a virtual infrastructure platform and second components of a physical infrastructure platform. The processing device is further configured to generate a graphical representation based on the associations for the first components and the second components. The processing device is further configured to cause instantiation of one or more processing elements configured to perform at least one management function in accordance with at least one of the virtual infrastructure platform and the physical infrastructure platform, based on the graphical representation.

Advantageously, illustrative embodiments provide service instance management with improved scaling functionality wherein automation (e.g., management function) container count can be reduced in an SDDC or other information processing system environment resulting in significant savings in computing, storage and/or network resources. Also, with fewer processing elements, such as containers, serviceability and debuggability become easier yielding a better user experience.

These and other illustrative embodiments include, without limitation, methods, apparatus, networks, systems, and processor-readable storage media.

BRIEF DESCRIPTION OF THE DRAWINGS

FIG. 4 illustrates an association table for use in service affiliation management according to an illustrative embodiment.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources. Such systems are considered examples of what are more generally referred to herein as cloud-based computing environments. Some cloud infrastructures) are within the exclusive control and management of a given enterprise, and therefore are considered "private clouds." The term "enterprise" as used herein is intended to be broadly construed, and may comprise, for example, one or more businesses, one or more corporations or any other one or more entities, groups, or organizations. An "entity" as illustratively used herein may be a person or system. On the other hand, cloud infrastructures that are used by multiple enterprises, and not necessarily controlled or managed by any of the multiple enterprises but rather respectively controlled and managed by third-party cloud providers, are typically considered "public clouds." Enterprises can choose to host their applications or services on private clouds, public clouds, and/or a combination of private and public clouds (hybrid clouds) with a vast array of computing resources attached to or otherwise a part of the infrastructure. Numerous other types of enterprise computing and storage systems are also encompassed by the term "information processing system" as that term is broadly used herein.

Figure 1:
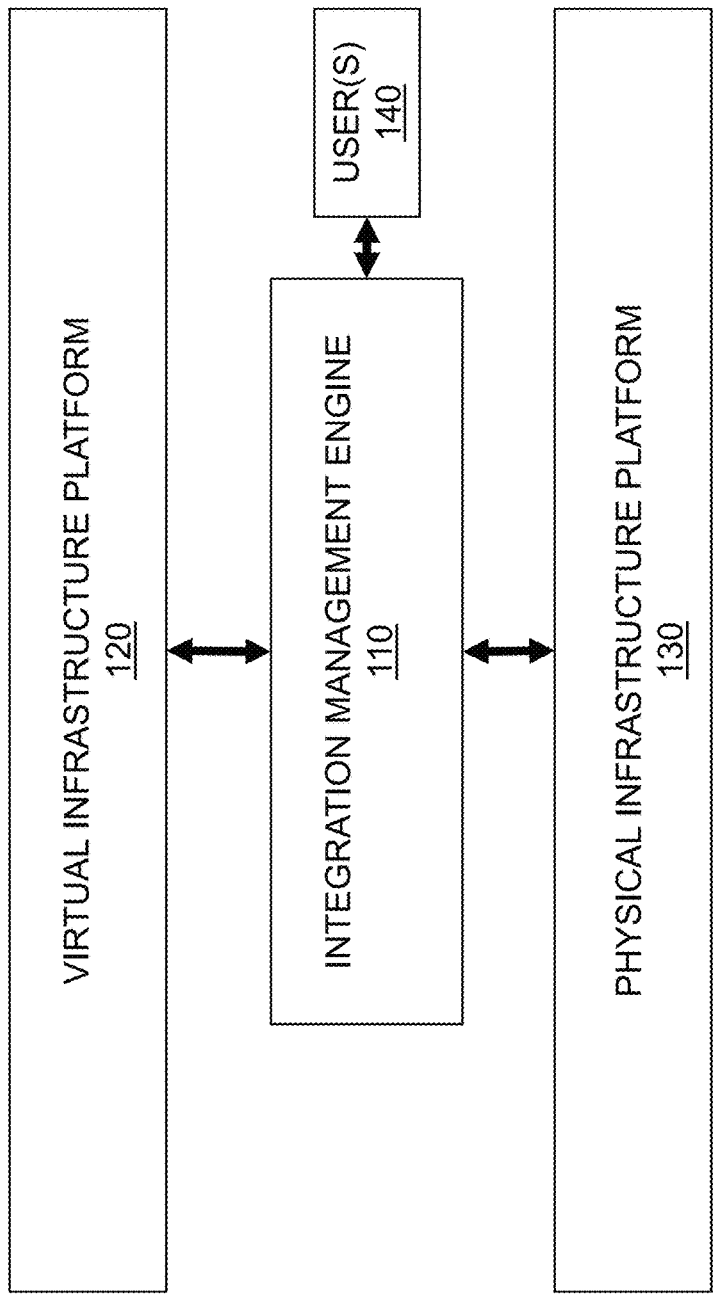
FIG. 1 illustrates an information processing system environment according to an illustrative embodiment.

FIG. 1 illustrates an information processing system environment 100 according to an illustrative embodiment. More particularly, as shown, an integration management engine 110 is operatively coupled between a virtual infrastructure platform 120 and a physical infrastructure platform 130.

In one or more illustrative embodiments, information processing system environment 100 may be considered, or otherwise part of, a software defined data center (SDDC). In such illustrative embodiments, integration management engine 110 can be implemented as an SDDC management application to provide network automation by integrating virtual infrastructure platform 120 and physical infrastructure platform 130. More particularly, integration management engine 110 can be configured, in some embodiments, as a user interface (UI) for a user(s) 140 to manage automation provided in accordance with virtual infrastructure platform 120 and/or physical infrastructure platform 130, as will be explained in detail herein.

In one non-limiting example, integration management engine 110 can comprise or otherwise incorporate and adapt the Open Manage Network Integration (OMNI) virtual appliance available from Dell Technologies (Dell). OMNI is designed to complement the SmartFabric Services (SFS) automation framework also commercially available from Dell. SFS is an example of an automation framework that integrates converged infrastructure (CI) and hyperconverged infrastructure (HCI) systems to provide autonomous fabric deployment, expansion, and life cycle management. SFS enables CI and HCI for system administrators to deploy and operate the network fabric for the infrastructure solution as an extension of the solution being deployed. There are two types of SFS: (i) SFS for Leaf and Spine supported on various Dell EMC S-series and Z-series PowerSwitches; and (ii) SFS for PowerEdge MX supported on PowerEdge MX switches.

OMNI can be implemented as a virtual appliance that can be deployed as: (i) a stand-alone virtual machine enabling a web portal to manage one or more SmartFabric (SFS) Instances; and (ii) an external plug-in for a vCenter. A vCenter is server (host) management software commercially available from VMware Inc. that provides a centralized platform for controlling vSphere (VMware's cloud computing virtualization platform) environments allowing to automate and deliver a virtual infrastructure across a hybrid cloud. When deployed as a plug-in for VMware vCenter, OMNI enables: (i) zero-touch automation of physical underlay network fabric running SFS corresponding to changes in the virtual network layer; (ii) extension of vCenter host network inventory data to include physical switch connectivity details for monitoring and troubleshooting; and (iii) a single pane of management for one or more SmartFabric instances through the OMNI portal pages that are embedded within vCenter.

OMNI supports integration with various deployments and solutions such as Dell PowerEdge MX and SmartFabric Storage Services (SFSS). Typically, continuous configuration changes of the virtual infrastructure in an SDDC necessitate an experienced and knowledgeable network administrator to configure the underlying physical network. OMNI provides automation by monitoring the virtual infrastructure for changes and automatically synchronizing the physical networking to support the observed changes in the virtual networking. Since OMNI is deployed as a virtual appliance, and the automation feature is provided via microservices deployed as containers, to get comprehensive network automation coverage in an SDDC, OMNI must launch a micro-service container for every single combination of vCenter and SFS pairing, i.e.:

Total Containers=$n*m$ n=Number of Controllers
m=Number of Network Fabrics

Once the container is launched, the automation service captures its assigned vCenter for virtual networking changes and modifies the appropriate physical network attributes on the associated SFS instance to synchronize the virtual network in vCenter and the physical network in SFS. With limited resources, it can only support a handful of automation micro-service containers. As is realized herein, the current model of 1:1 association between a northbound virtual network orchestrator and a southbound SFS instance is not scalable and will quickly surpass the current container limit. In SDDC terminology, "northbound" refers to an interface or protocol that allows a lower-level network component to communicate with a higher-level or more central component, while "southbound" refers to an interface or protocol that allows a higher-level component to send commands to lower-level network components. Manageability of these automation services also becomes an issue when there are too many services running since each service produces its logs, alerts, events, and notifications. This amounts to an additional load on the overall resources and yields an undesirable user experience.

Thus, since an SDDC management application (e.g., OMNI) needs to support larger deployments containing more associations between components of a virtual infrastructure platform and components of a physical infrastructure platform (e.g., vCenter and SFS instances), there is a need for an efficient and scalable technique to provide network automation with a smaller number of service containers. Note that while implementations involving OMNI, vCenter, and SFS frameworks are used herein to describe exemplary virtual and physical infrastructure platforms and issues with existing integration management approaches, solutions described herein in accordance with illustrative embodiments can apply to any SDDC, any data center, any virtual infrastructure platform, and/or any physical infrastructure platform, as well as to other information processing system environments.

Illustrative embodiments overcome the above-stated service scalability and other issues by providing service affiliation management functionalities to acquire relationship attributes between various virtual network controllers (e.g., part of virtual infrastructure platform 120) and physical network fabrics (e.g., part of physical infrastructure platform 130) to reduce the total number of micro-service containers. Instead of creating one service container per vCenter/SFS pair, an association graph is constructed using monitoring, querying and data mining. A node (or vertex) coloring algorithm is used to turn the association network graph into a bipartite graph with two disjoint sets U and V of nodes where each set contains nodes of one specific color. Another disjoint set W is constructed to keep track of discovered nodes without any service associations. The bipartite association graph makes it straightforward to create the minimum number of service containers in the fastest and most deterministic way by traversing through the disjoint set U and creating an automation service for every element in the set. Using this technique, the number of required microservice containers is reduced from $n*m$ to less than $(n+m-1)$, providing a significant saving in compute resources.

Figure 2:
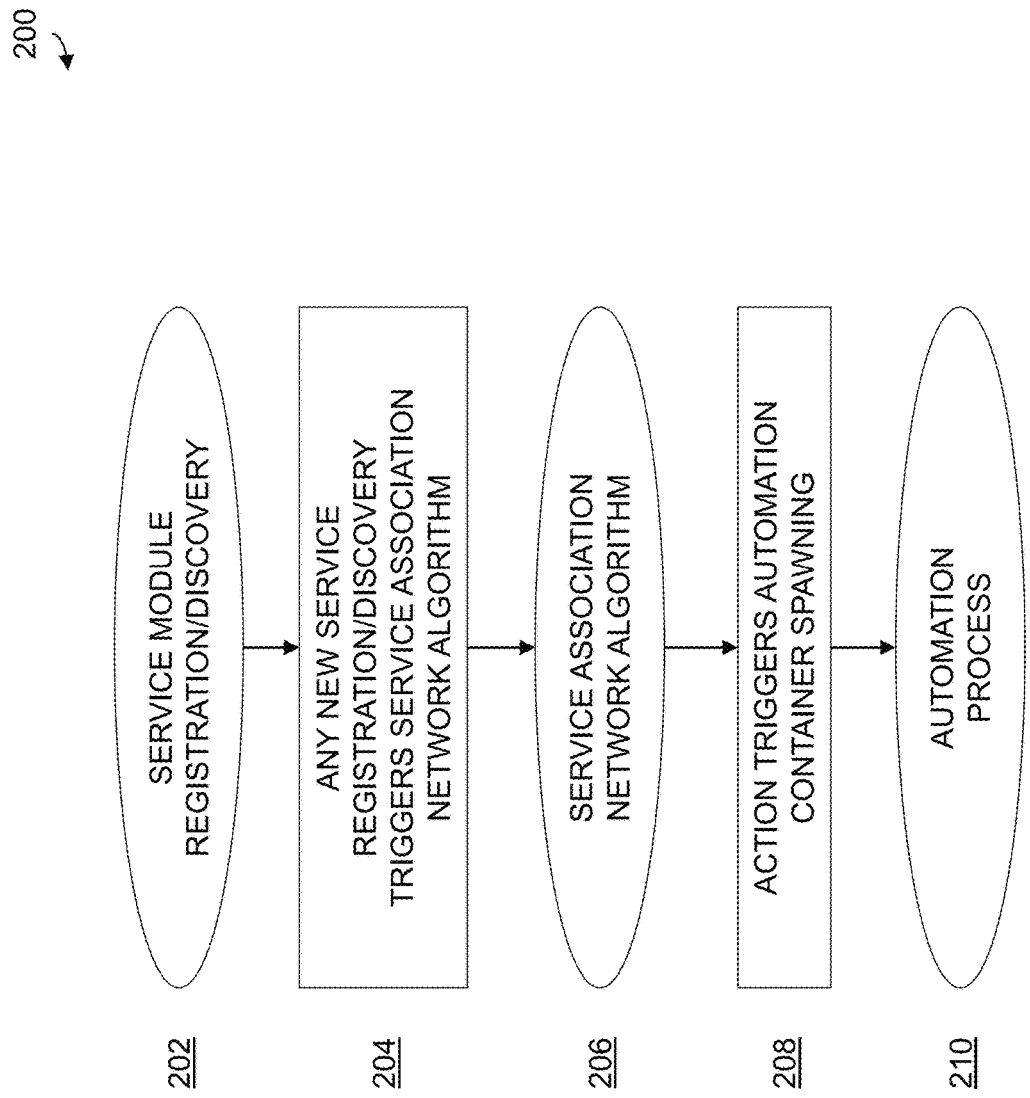
FIG. 2 illustrates a multi-stage workflow for service affiliation management in an integration management engine according to an illustrative embodiment.

FIG. 2 illustrates a multi-stage workflow 200 for service affiliation management that can be implemented in integration management engine 110 to achieve functionalities of illustrative embodiments described herein. In accordance with an illustrative embodiment, as shown, multi-stage workflow 200 comprises three main stages as explained below.

Stage 202 comprises a service module registration/discovery stage. More particularly, northbound and southbound interfaces are registered with integration management engine 110 either via discovery or explicit registration.

Then, as depicted by block 204, any new service registration/discovery in stage 202 triggers stage 206, i.e., a service association network algorithm. More particularly, interface association is performed by using a service association network comprising a network algorithm to create a colored bipartite graph to spawn automation service containers as depicted by stage 208. Once automation service containers are spawned, an automation process is executed in stage 210 wherein northbound interfaces publish tasks to the automation task queue to be consumed and processed by the service container. These stages will be further described in detail below in the context of FIG. 3.

Figure 3:
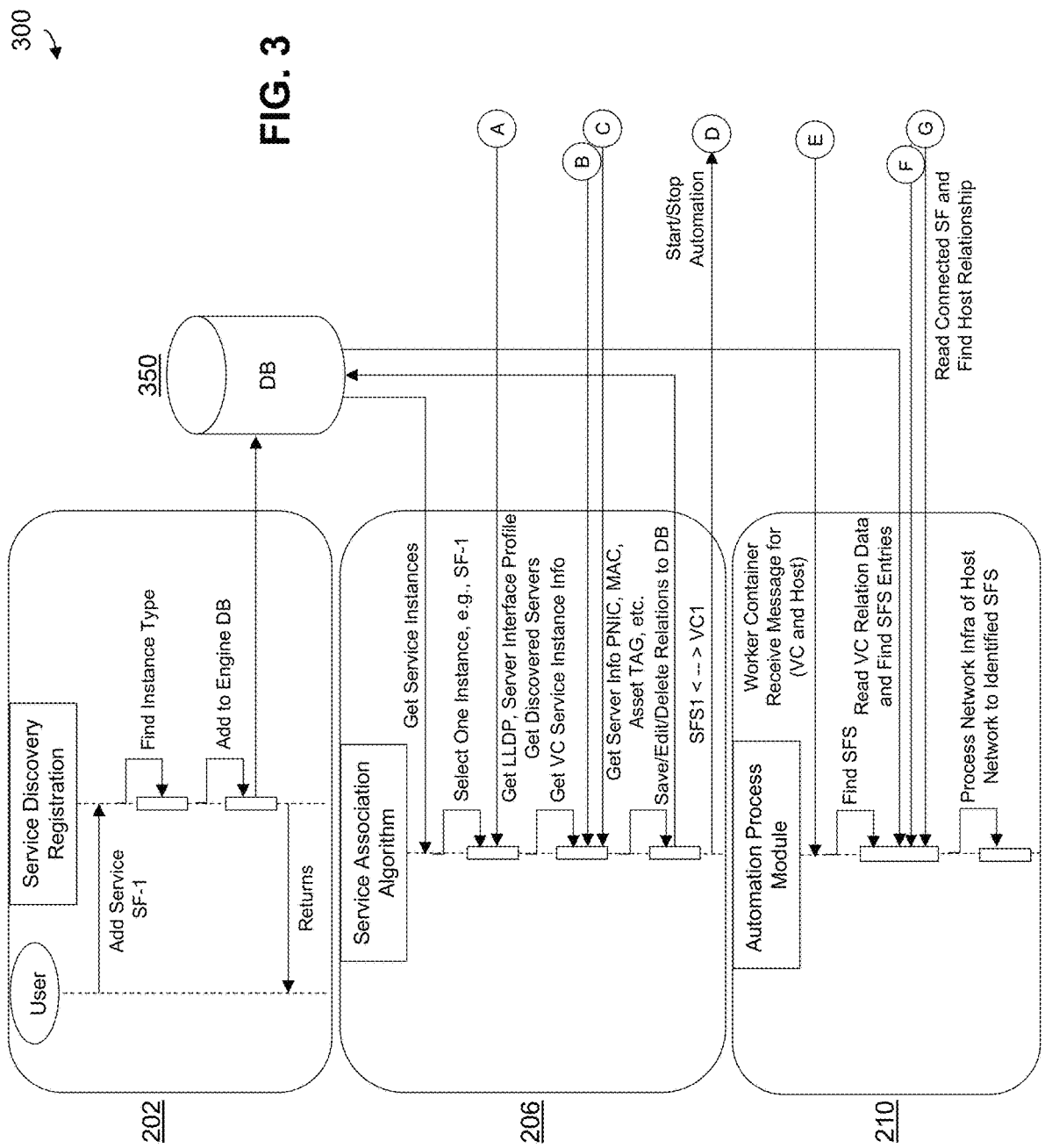
FIG. 3 illustrates an integration management engine environment configured with service affiliation management functionalities according to an illustrative embodiment.
Figure 3:
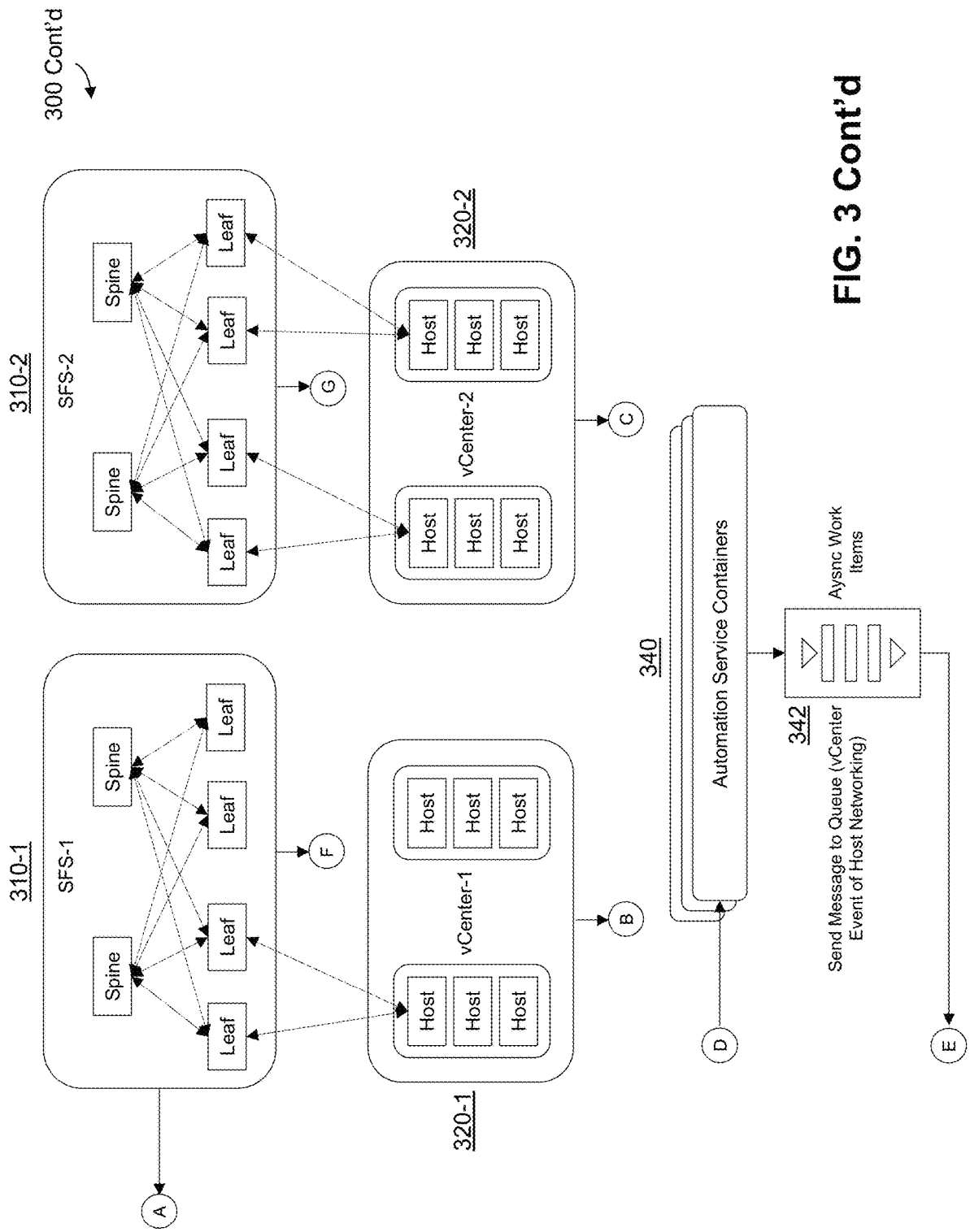

FIG. 3 illustrates an integration management engine environment 300 configured with service affiliation management functionalities according to an illustrative embodiment. More particularly, FIG. 3 illustrates a detailed sequence diagram describing multi-stage workflow 200 of FIG. 2. i.e., stages 202, 206, and 210. Note that, in some embodiments, multi-stage workflow 200 can be implemented as a state machine.

It is assumed that service roles are fluid and dependent on the automation context. There is no pre-defined pattern where the services can be categorized into northbound versus southbound services. Typical southbound services can act as an orchestrator to other southbound services. For example, in one SDDC implementation, assume a Dell MX chassis in a management services module (MSM) fabric is connected to leaf and spine switches in an SFS fabric, e.g., SFS fabric 310-1 (SFS-1) and SFS fabric 310-2 (SFS-2). Assume that vCenter is the northbound interface to an MSM fabric, e.g., vCenter 320-1 (vCenter-1) and vCenter 320-2 (vCenter-2). Configurations on an MSM fabric require proper uplinks (e.g., leaf and spine) configurations. Hence, MSM acts as a northbound interface to an SFS Fabric. Monitoring containers, i.e., automation service containers 340, must be launched for a vCenter as well as the MSM service.

Accordingly, as shown in stage 202 in FIG. 3, northbound and southbound services are either discovered or registered by a user via an API service of integration management engine 110. Service details get added to a database (DB) 350 and the state machine progresses to the next stage, i.e., stage 206.

In stage 206 in FIG. 3, an association network service monitors/queries all northbound interfaces in DB 350 to extract information about the virtual interfaces. All southbound services are monitored/queried for physical interfaces. The service endpoints are stored in DB 350 in an association table if an association is identified. The user is also given the ability to explicitly override relationships (either discovered or pre-provisioned) between southbound and northbound interfaces. These service relationships are captured in the association table and then converted into an undirected association network graph as follows:
(i) Each service represents a node in the graph;
(ii) Each edge represents an association between two service endpoints; and
(iii) Association can either be discovered (dynamically) or configured in a pre-provisioning operation. Association attributes can, by way of example only, include a media access control (MAC) address, an asset tag, a server interface profile, a peripheral component interconnect express (PCIe) address, etc.

In illustrative embodiments, a node coloring technique is utilized to convert the association network graph into a bipartite association graph with two disjoint sets U and V of nodes where each set contains nodes of one specific color. Typically, the number of northbound interfaces is less than that of southbound interfaces. The bipartite association graph is used to launch automation service containers as follows:
(i) Traverse through each element of U and spawn automation service containers; and
(ii) When a new service is discovered the association algorithm is run to update the table and a corresponding generated graph.

In stage 210 in FIG. 3, the automation process module changes the mapping containers when notified by the association module (stage 206). Notification is based on asynchronous (async) messages or via polling for a new association graph. When a change is detected, service creation tasks are published to a message queue 342 and any detected virtual network change spawns a task. Tasks identify the northbound service that has been changed. Worker containers are subscribed to the queue and process the tasks.

Southbound services are identified as follows:
(i) Northbound service (specified in the task) is queried to find virtual interfaces;
(ii) A bipartite graph stored in DB 350 is queried for all affiliated southbound interfaces;
(iii) Virtual interfaces are matched with physical interfaces; and
(iv) A worker container uses the virtual interface information to configure the physical interfaces on the southbound service.

A service association algorithm (stage 206) flow according to an illustrative embodiment will now be described as follows:
(i) Service association service periodically queries all southbound and northbound services to construct a relationship between services;
(ii) Query northbound APIs (e.g., vCenter, MX (OME-M)) to collect server-facing port information of server physical adapter;
(iii) Query southbound SmartFabric APIs to collect LLDP information fabric is getting from connected server ports (e.g., MAC, Asset ID, Hostname of servers, etc.);
(iv) Southbound interface profiles (e.g., server interface profile in SFS) are also checked if the physical links between the equipment are not completed;
(v) An attribute to determine association is identified in northbound and southbound services, e.g., VxRail and PowerOne use MAC-addr in vCenter VM Network Interface Controllers (NICs) and Server Interface Profiles in the SFS/SFSS;
(vi) A row is added to the association table to store the relationship as shown in an association table 400 in FIG. 4; and
(vii) Information captured in association table 400 can be modeled as an undirected graph G on which a node coloring algorithm is executed to obtain the following properties:

$$G=(U,V,W,E)$$

Figure 5:
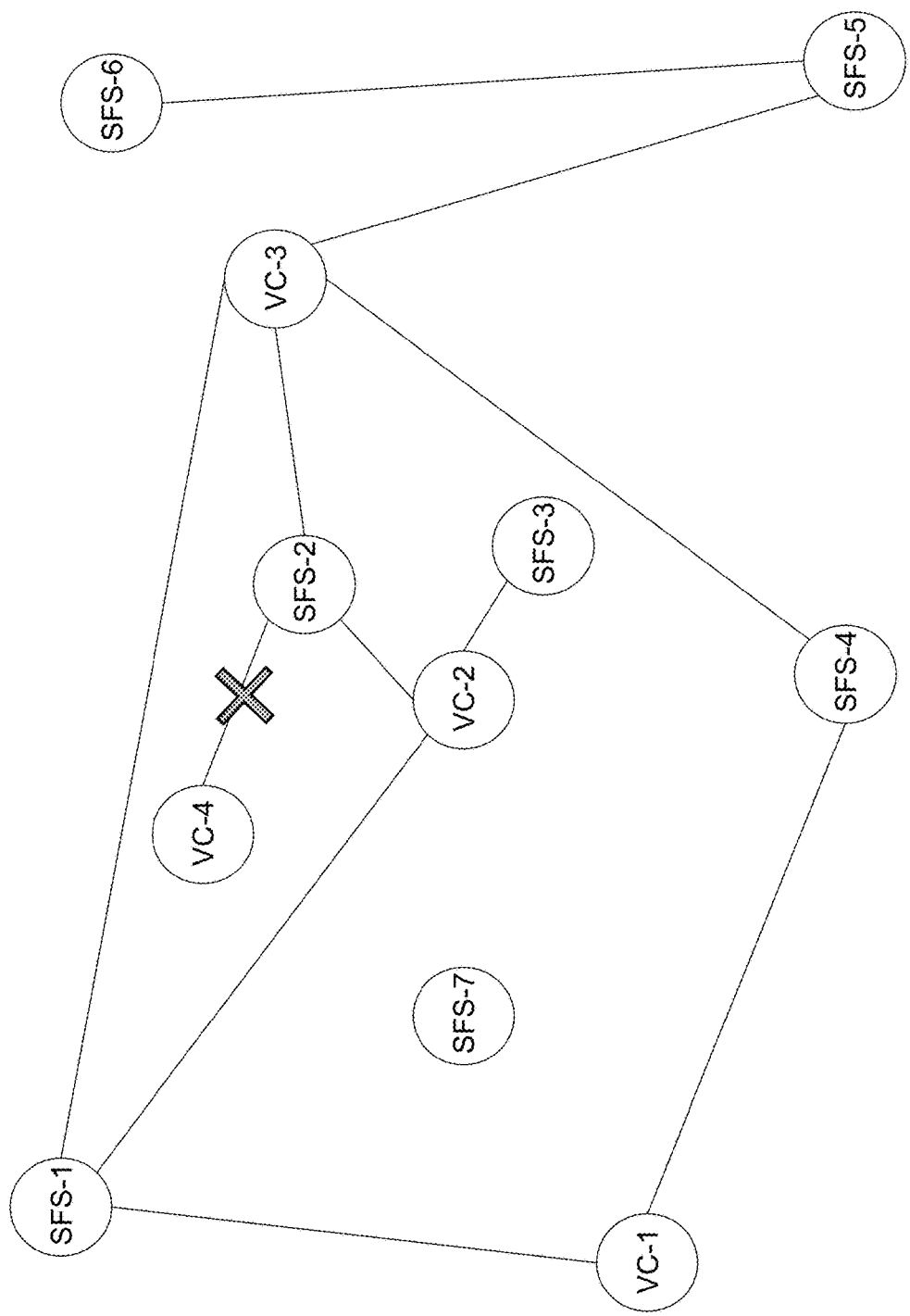
FIGS. 5-7 illustrate a node coloring algorithm for use in service affiliation management according to an illustrative embodiment.

U: Size n. Disjoint set of Network Controllers discovered with associations in V.
V: Size m. Disjoint set of Network Fabrics discovered with associations in U.
E: A set of edges such that an element in U is connected to at least one element in V.
W: Size k. Disjoint set of nodes with no associations in V or W.
Typically: $k \ll n \ll m$ The graph generated from the association table is shown as a graph 500 in FIG. 5.

Figure 6:
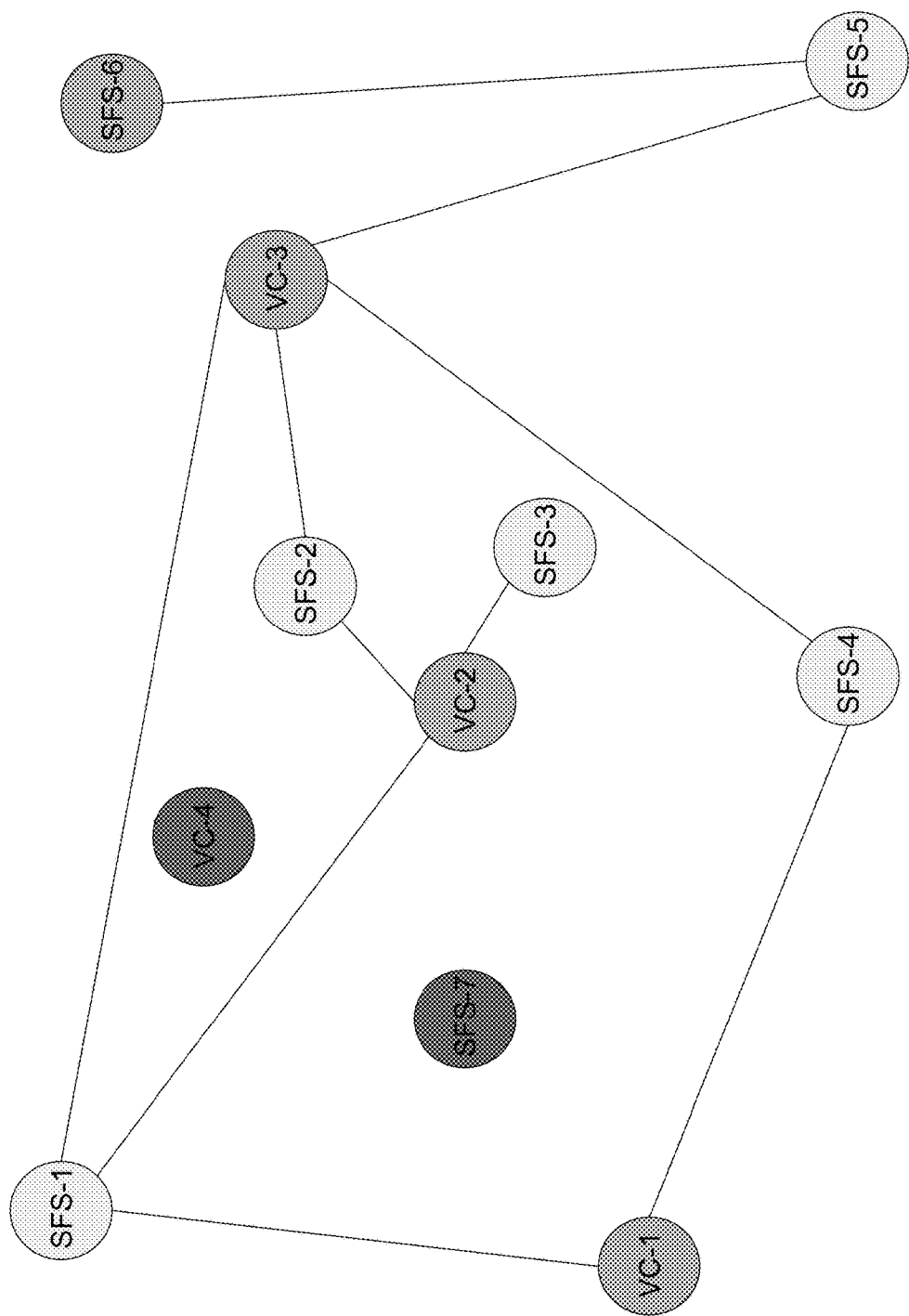

The node coloring algorithm is executed on the generated undirected graph resulting in a graph 600 in FIG. 6.

Figure 7:
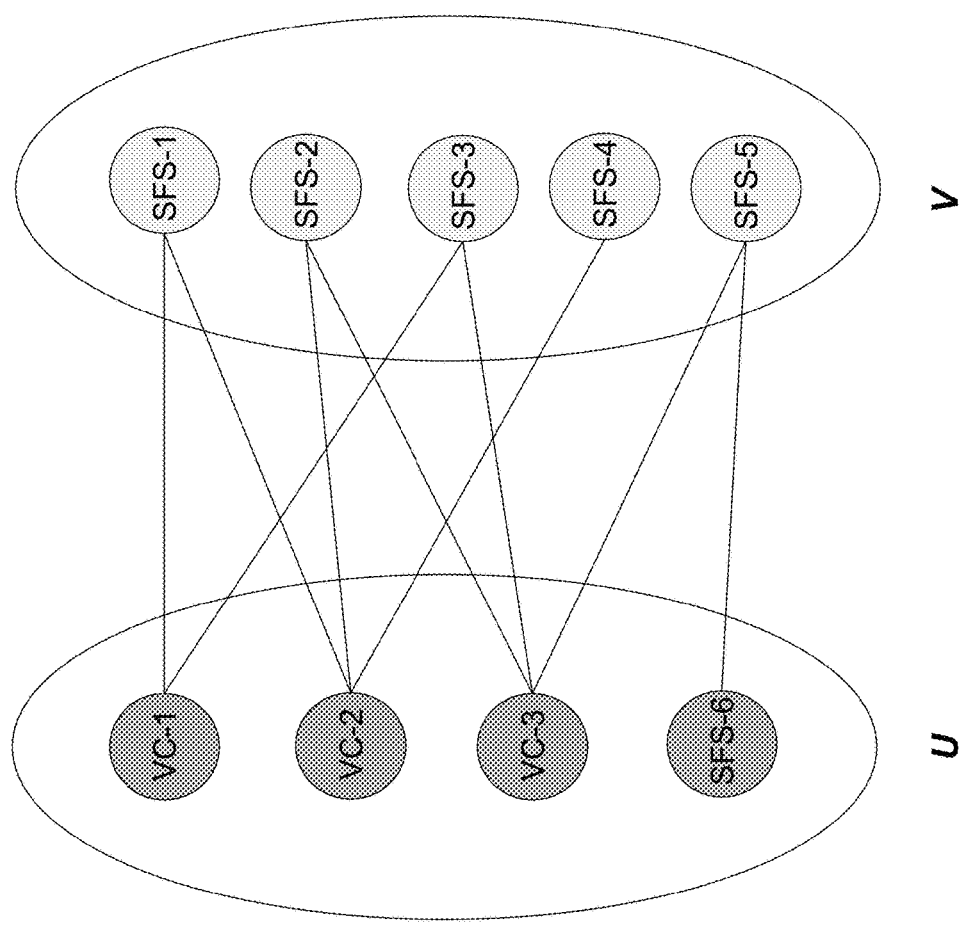

After running the node coloring algorithm on the example association network graph, a bipartite association graph G is obtained as shown in a graph 700 in FIG. 7.

Once the nodes are placed into disjoint sets, the automation container queue service starts and a container is assigned to each northbound service, and container(s) will be dedicated to processing tasks in the queue. When northbound automation is enabled, each northbound service with edges has a dedicated container that monitors the service for changes. The monitoring containers publish a task with the northbound information. Task processing containers acquire the changed virtual interfaces by querying the northbound service specified in a task. The association table in DB 350 is used to look up the southbound service and virtual interface relationship. The southbound service's physical interface is configured to reflect the virtual interface.

In one exemplary use case in the context of FIG. 3, integration management engine 110 (multi-stage workflow 200 with stages 202, 206, and 210) is deployed in vCenter with SmartFabric Service or SmartFabric Storage Service. Integration management engine 110 has containers monitoring the vCenter to look for any changes to the host networking of an ESXi installation. When a change to a host is detected, a task containing the vCenter hostname, and a list of hosts that have been modified is published to the task queue. The tasks will be picked up by the worker containers. The tasks will query the vCenter for each host and retrieve the virtual interface (virtual NIC) on a host. Additionally, all port groups associated with a virtual NIC are retrieved. Physical interfaces (Server Interface Profile) whose information is stored in DB 350 by the service association algorithm are queried. Any physical interface with the same MAC address as the virtual interface is matched together. This relationship determines which SFS to query. The matched SFS of a virtual NIC is used to configure the Server Interface Profile.

Thus, while the existing approach launches a microservice container for every vCenter-SFS pair, i.e., 1:1 mapping, and instantiates a microservice container for every registered vCenter, illustrative embodiments provide significant advantages over the existing approach because a northbound interface is not a designation (e.g., vCenter) but a role. In this role, the northbound interface acts as an automation driver for the underlying physical network. Hence, a northbound interface role is not restricted to virtual network controllers such as a vCenter. In an example of a Dell PowerOne deployment, a physical network (i.e., MSM) can act as a controller for another physical network (i.e., SFS). Hence, the existing approach of launching an automation container per vCenter will miss out on instantiating a container for MSM in a PowerOne deployment scenario as stated above. Further, in addition to zero-touch automation, the existing approach also provides UI services to a northbound interface. If a northbound interface is registered for UI and does not need automation service, the existing approach will unnecessarily spawn a container for this northbound interface. Still further, in the event of a manual override, a registered northbound interface does not require automation. However, the existing approach will still launch a container unnecessarily.

In contrast to the existing approach, illustrative embodiments build an association table that captures dynamic relationships between various interfaces and converts the declarative paradigm into an imperative generalized mathematical technique of a bipartite structure to find an optimal outcome of spawning a minimal number of service containers that overcomes the above and other shortcomings of the existing approach. Using the service affiliation management techniques described herein, any arbitrary hierarchical span of physical networks controlling other physical networks can be optimally derived using the association table. This results in never missing out on any automation task, be it a virtual network controller or a physical network acting as a controller for another physical network.

Illustrative embodiments advantageously reduce the automation container count from n×m to less than (n+m−1). This provides significant resource saving from quadratic complexity $O(nm)$ to linear complexity $O(n+m-1) \approx O(n)$. Since the algorithm is change triggered, any new service associations are handled quickly resulting in saving of resources. For example, if a vCenter has no more associations, the automation container associated with that vCenter is shut down. Orchestrators and fabrics are queried less due to no overlap between services, resulting in saving in computing resources. The solution supports on-premises as well as cloud deployments. Orchestrators and network fabrics can be in the same or disparate management domain. The solution breaks down the complex hierarchical relationship of service instances (e.g., VC1-OME1-SFS1-SFS2 . . . ) into simplified bipartite connections. With fewer containers, serviceability and debuggability become easier yielding a better user experience.

Figure 8:
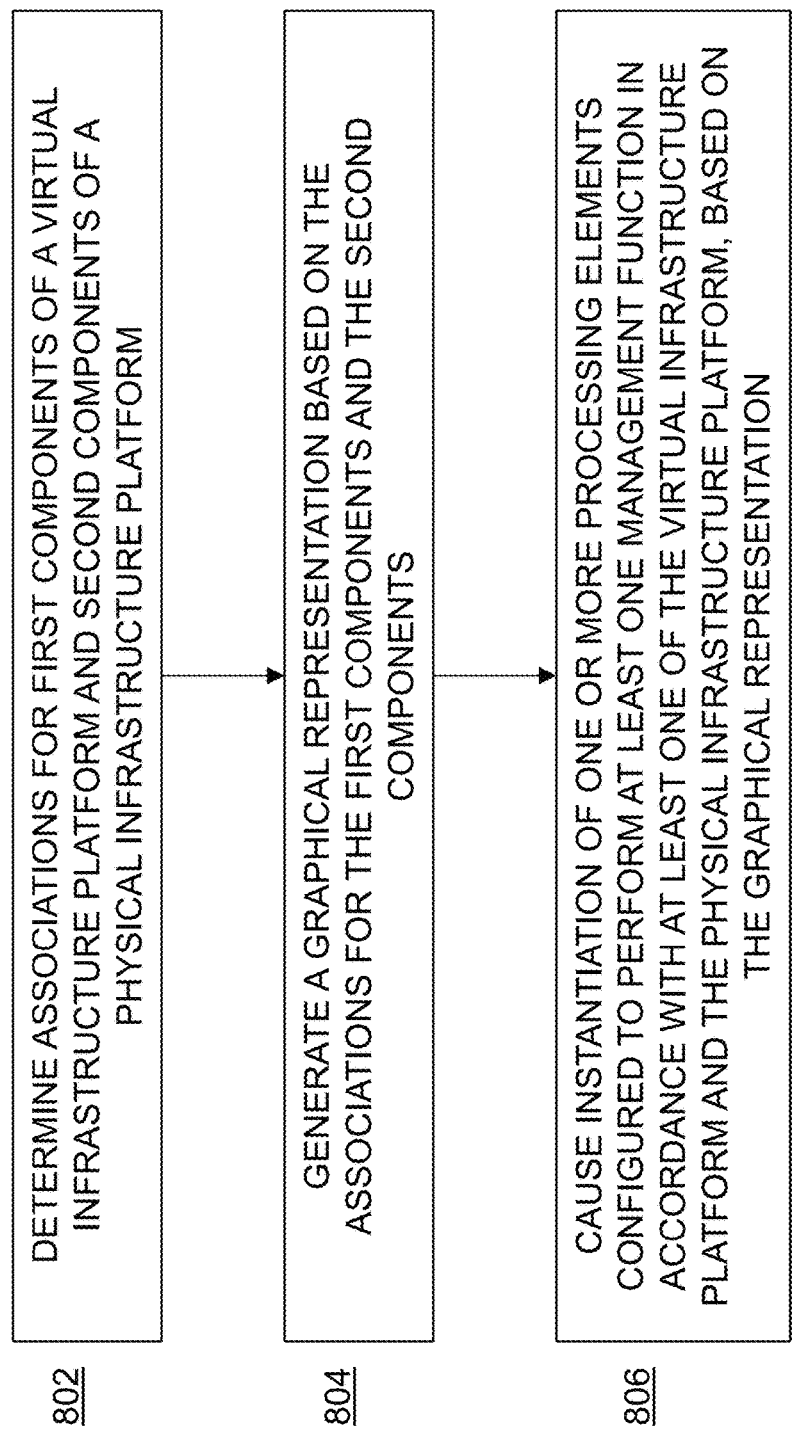
FIG. 8 illustrates a methodology for service affiliation management according to an illustrative embodiment.

FIG. 8 illustrates a methodology 800 for service affiliation management according to an illustrative embodiment. More particularly, methodology 800 comprises the following steps.

Step 802 determines associations for first components of a virtual infrastructure platform and second components of a physical infrastructure platform.

Step 804 generates a graphical representation based on the associations for the first components and the second components.

Step 806 causes instantiation of one or more processing elements configured to perform at least one management function in accordance with at least one of the virtual infrastructure platform and the physical infrastructure platform, based on the graphical representation.

In some embodiments of methodology 800, a determined association is between one of the first components and one of the second components, between one of the first components and another one of the first components, or between one of the second components and another one of the second components.

In some embodiments of methodology 800, the first components and the second components comprise one or more of a service, an interface, and a protocol.

In some embodiments of methodology 800, when determining associations for the first components of the virtual infrastructure platform and the second components of the physical infrastructure platform, the methodology obtains one or more attributes for each of the first components and the second components, and generates an association data structure using the one or more attributes for each of the first components and the second components, wherein the association data structure associates ones of the first components and the second components with other ones of the first components and the second components based on the one or more attributes to represent relationships therebetween.

In some embodiments of methodology 800, when determining associations for the first components of the virtual infrastructure platform and the second components of the physical infrastructure platform, the methodology enables modification of the association data structure to override relationships represented therein.

In some embodiments of methodology 800, when generating the graphical representation based on the associations for the first components and the second components, the methodology converts the association data structure to an undirected graph wherein nodes in the undirected graph represent the first components and the second components, and edges in the undirected graph between the nodes represent associations between ones of the first components and the second components with other ones of the first components and the second components.

In some embodiments of methodology 800, when generating the graphical representation based on the associations for the first components and the second components, the methodology applies a node coloring algorithm to the undirected graph to generate a bipartite association graph.

In some embodiments of methodology 800, the bipartite association graph comprises two disjoint sets of nodes wherein nodes in a first one of the two disjoint sets of nodes represent the ones of the first components and the second components that function in a first operational direction of their corresponding relationships with the other ones of the first components and the second components, and wherein nodes in a second one of the two disjoint sets of nodes represent the ones of the first components and the second components that function in a second operational direction of their corresponding relationships with the other ones of the first components and the second components.

In some embodiments of methodology 800, the bipartite association graph further comprises a third disjoint set of nodes representing ones of the first components and the second components with no associations.

In some embodiments of methodology 800, when causing instantiation of one or more processing elements configured to perform at least one management function, based on the graphical representation, the methodology traverses the first one of the two disjoint sets of nodes and spawns an automation service container for each node in the first one of the two disjoint sets of nodes.

In some embodiments of methodology 800, the methodology updates the graphical representation and causes instantiation of one or more additional processing elements based on the updated graphical representation.

In some embodiments of methodology 800, the virtual infrastructure platform and the physical infrastructure platform are part of a software-defined data center.

Illustrative embodiments of processing platforms utilized to implement functionality for service affiliation management will now be described in greater detail with reference to FIGS. 9 and 10. Although described in the context of information processing system workflows and/or environments 100/200/300, these platforms may also be used to implement at least portions of other information processing systems in other embodiments.

Figure 9:
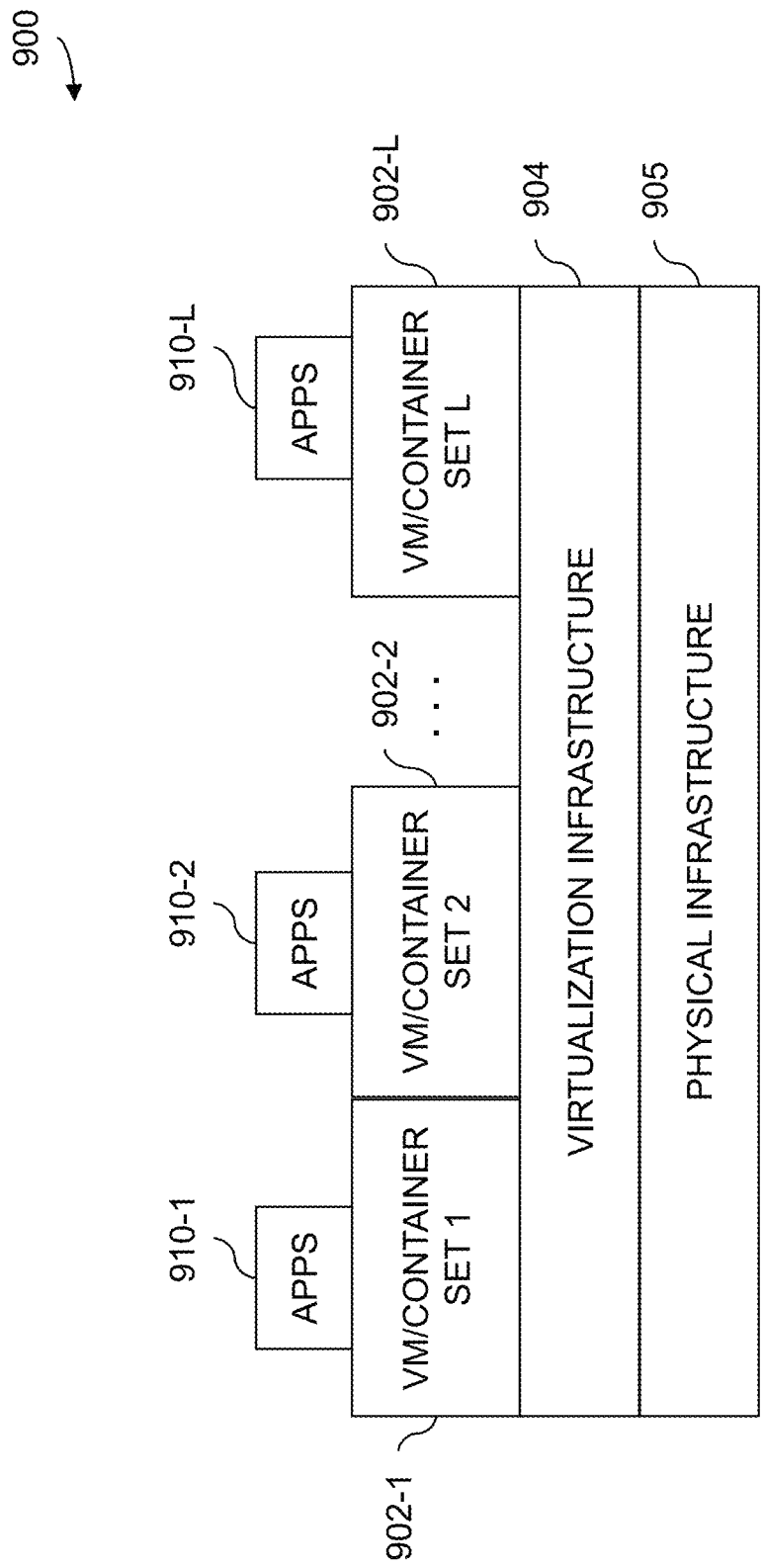
FIGS. 9 and 10 illustrate examples of processing platforms that may be utilized to implement at least a portion of an information processing system in illustrative embodiments.
Figure 10:
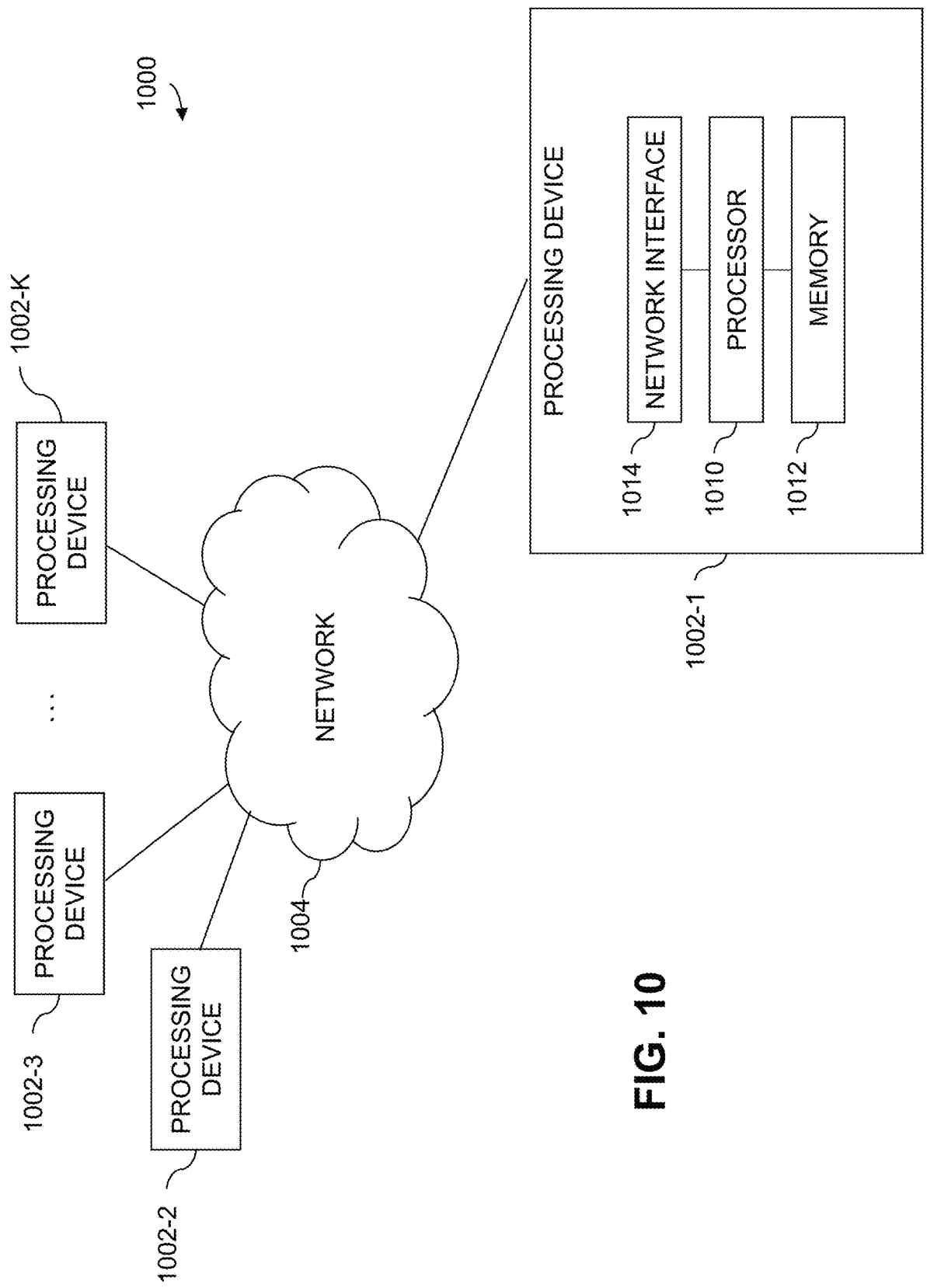

FIG. 9 shows an example processing platform comprising infrastructure 900. Infrastructure 900 comprises a combination of physical and virtual processing resources that may be utilized to implement at least a portion of information processing system workflows and/or environments 100/200/300. Infrastructure 900 comprises multiple virtual machines (VMs) and/or container sets 902-1, 902-2 . . . 902-L implemented using virtualization infrastructure 904. The virtualization infrastructure 904 runs on physical infrastructure 905, and illustratively comprises one or more hypervisors and/or operating system level virtualization infrastructure. The operating system level virtualization infrastructure illustratively comprises kernel control groups of a Linux operating system or other type of operating system.

Infrastructure 900 further comprises sets of applications 910-1, 910-2 . . . 910-L running on respective ones of the VMs/container sets 902-1, 902-2 . . . 902-L under the control of the virtualization infrastructure 904. The VMs/container sets 902 may comprise respective VMs, respective sets of one or more containers, or respective sets of one or more containers running in VMs.

In some implementations of the FIG. 9 embodiment, the VMs/container sets 902 comprise respective VMs implemented using virtualization infrastructure 904 that comprises at least one hypervisor. A hypervisor platform may be used to implement a hypervisor within the virtualization infrastructure 904, where the hypervisor platform has an associated virtual infrastructure management system. The underlying physical machines may comprise one or more distributed processing platforms that include one or more storage systems.

In other implementations of the FIG. 9 embodiment, the VMs/container sets 902 comprise respective containers implemented using virtualization infrastructure 904 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of information processing system workflows and/or environments 100/200/300 may each run on a computer, server, storage device or other processing platform element. A given such element may be viewed as an example of what is more generally referred to herein as a "processing device." Infrastructure 900 shown in FIG. 9 may represent at least a portion of one processing platform. Another example of such a processing platform is processing platform 1000 shown in FIG. 10.

The processing platform 1000 in this embodiment comprises at least a portion of information processing system workflows and/or environments 100/200/300 and includes a plurality of processing devices, denoted 1002-1, 1002-2, 1002-3, . . . 1002-K, which communicate with one another over a network 1004.

The network 1004 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1002-1 in the processing platform 1000 comprises a processor 1010 coupled to a memory 1012.

The processor 1010 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1012 may comprise random access memory (RAM), read-only memory (ROM), flash memory or other types of memory, in any combination. The memory 1012 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1002-1 is network interface circuitry 1014, which is used to interface the processing device with the network 1004 and other system components and may comprise conventional transceivers.

The other processing devices 1002 of the processing platform 1000 are assumed to be configured in a manner similar to that shown for processing device 1002-1 in the figure.

Again, the particular processing platform 1000 shown in the figure is presented by way of example only, and information processing system workflows and/or environments 100/200/300 may include additional or alternative processing platforms, as well as numerous distinct processing platforms in any combination, with each such platform comprising one or more computers, servers, storage devices or other processing devices. For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for program code management as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, edge computing environments, applications, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
at least one processing platform comprising at least one processor coupled to at least one memory, wherein the at least one processing platform is configured to:
determine associations for first components of a virtual infrastructure platform and second components of a physical infrastructure platform;
generate a graphical representation based on the associations for the first components and the second components;
cause instantiation of one or more processing elements configured to perform at least one management function in accordance with at least one of the virtual infrastructure platform and the physical infrastructure platform, based on the graphical representation;
periodically query the first components and the second components, wherein the querying detects one or more virtual network changes and, in response to the one or more virtual network changes, one or more service creation tasks are published to a message queue, and wherein the one or more service creation tasks identify at least one first component of the first components associated with the one or more virtual network changes;
cause instantiation of one or more processing elements configured to process the one or more service creation tasks;
change a mapping of one or more containers and the graphical representation based on a notification, the notification based on at least one of asynchronous messages and polling for a new association graph; and
configure a physical interface of one or more of the second components to reflect the changed mapping.

2. The apparatus of claim 1, wherein a determined association is between one of the first components and one of the second components, between one of the first components and another one of the first components, or between one of the second components and another one of the second components.

3. The apparatus of claim 1, wherein the first components and the second components comprise one or more of a service, an interface, and a protocol.

4. The apparatus of claim 1, wherein, when determining associations for the first components of the virtual infrastructure platform and the second components of the physical infrastructure platform, the at least one processing platform is further configured to:
obtain one or more attributes for each of the first components and the second components; and
generate an association data structure using the one or more attributes for each of the first components and the second components, wherein the association data structure associates ones of the first components and the second components with other ones of the first components and the second components based on the one or more attributes to represent relationships therebetween.

5. The apparatus of claim 4, wherein, when determining associations for the first components of the virtual infrastructure platform and the second components of the physical infrastructure platform, the at least one processing platform is further configured to:
enable modification of the association data structure to override relationships represented therein.

6. The apparatus of claim 4, wherein, when generating the graphical representation based on the associations for the first components and the second components, the at least one processing platform is further configured to:
convert the association data structure to an undirected graph wherein nodes in the undirected graph represent the first components and the second components, and edges in the undirected graph between the nodes represent associations between ones of the first components and the second components with other ones of the first components and the second components.

7. The apparatus of claim 6, wherein, when generating the graphical representation based on the associations for the first components and the second components, the at least one processing platform is further configured to:
apply a node coloring algorithm to the undirected graph to generate a bipartite association graph.

8. The apparatus of claim 7, wherein the bipartite association graph comprises two disjoint sets of nodes wherein nodes in a first one of the two disjoint sets of nodes represent the ones of the first components and the second components that function in a first operational direction of their corresponding relationships with the other ones of the first components and the second components, and wherein nodes in a second one of the two disjoint sets of nodes represent the ones of the first components and the second components that function in a second operational direction of their corresponding relationships with the other ones of the first components and the second components.

9. The apparatus of claim 8, wherein the bipartite association graph further comprises a third disjoint set of nodes representing ones of the first components and the second components with no associations.

10. The apparatus of claim 8, wherein, when causing instantiation of one or more processing elements configured to perform at least one management function, based on the graphical representation, the at least one processing platform is further configured to:
traverse the first one of the two disjoint sets of nodes and spawn an automation service container for each node in the first one of the two disjoint sets of nodes.

11. The apparatus of claim 1, wherein the at least one processing platform is further configured to:
update the graphical representation and cause instantiation of one or more additional processing elements based on the updated graphical representation.

12. The apparatus of claim 1, wherein the virtual infrastructure platform and the physical infrastructure platform are part of a software-defined data center.

13. A computer program product comprising a non-transitory processor-readable storage medium having stored therein one or more software programs wherein, when executed by at least one processing device, causes the at least one processing device to:
determine associations for first components of a virtual infrastructure platform and second components of a physical infrastructure platform;
generate a graphical representation based on the associations for the first components and the second components;
cause instantiation of one or more processing elements configured to perform at least one management function in accordance with at least one of the virtual infrastructure platform and the physical infrastructure platform, based on the graphical representation;
periodically query the first components and the second components, wherein the querying detects one or more virtual network changes and, in response to the one or more virtual network changes, one or more service creation tasks are published to a message queue, and wherein the one or more service creation tasks identify at least one first component of the first components associated with the one or more virtual network changes;
cause instantiation of one or more processing elements configured to process the one or more service creation tasks;
change a mapping of one or more containers and the graphical representation based on a notification, the notification based on at least one of asynchronous messages and polling for a new association graph; and
configure a physical interface of one or more of the second components to reflect the changed mapping.

14. The computer program product of claim 13, wherein, when determining associations for the first components of the virtual infrastructure platform and the second components of the physical infrastructure platform, the one or more software programs, when executed by the at least one processing device, causes the at least one processing device to:
obtain one or more attributes for each of the first components and the second components; and
generate an association data structure using the one or more attributes for each of the first components and the second components, wherein the association data structure associates ones of the first components and the second components with other ones of the first components and the second components based on the one or more attributes to represent relationships therebetween.

15. The computer program product of claim 14, wherein, when generating the graphical representation based on the associations for the first components and the second components, the one or more software programs, when executed by the at least one processing device, causes the at least one processing device to:
convert the association data structure to an undirected graph wherein nodes in the undirected graph represent the first components and the second components, and edges in the undirected graph between the nodes represent associations between ones of the first components and the second components with other ones of the first components and the second components.

16. The computer program product of claim 15, wherein, when generating the graphical representation based on the associations for the first components and the second components, the one or more software programs, when executed by the at least one processing device, causes the at least one processing device to:
apply a node coloring algorithm to the undirected graph to generate a bipartite association graph, wherein the bipartite association graph comprises two disjoint sets of nodes wherein nodes in a first one of the two disjoint sets of nodes represent the ones of the first components and the second components that function in a first operational direction of their corresponding relationships with the other ones of the first components and the second components, and wherein nodes in a second one of the two disjoint sets of nodes represent the ones of the first components and the second components that function in a second operational direction of their corresponding relationships with the other ones of the first components and the second components.

17. The computer program product of claim 16, wherein, when causing instantiation of one or more processing elements configured to perform at least one management function, based on the graphical representation, the one or more software programs, when executed by the at least one processing device, causes the at least one processing device to:

traverse the first one of the two disjoint sets of nodes and spawn an automation service container for each node in the first one of the two disjoint sets of nodes.

18. A method comprising:

determining associations for first components of a virtual infrastructure platform and second components of a physical infrastructure platform;

generating a graphical representation based on the associations for the first components and the second components;

causing instantiation of one or more processing elements configured to perform at least one management function in accordance with at least one of the virtual infrastructure platform and the physical infrastructure platform, based on the graphical representation;

periodically querying the first components and the second components, wherein the querying detects one or more virtual network changes and, in response to the one or more virtual network changes, one or more service creation tasks are published to a message queue, and wherein the one or more service creation tasks identify at least one first component of the first components associated with the one or more virtual network changes;

causing instantiation of one or more processing elements configured to process the one or more service creation tasks;

changing a mapping of one or more containers and the graphical representation based on a notification, the notification based on at least one of asynchronous messages and polling for a new association graph; and configuring a physical interface of one or more of the second components to reflect the changed mapping;

wherein the method is performed by at least one processing platform comprising at least one processor coupled to at least one memory.

19. The method of claim 18, wherein a determined association is between one of the first components and one of the second components, between one of the first components and another one of the first components, or between one of the second components and another one of the second components.

20. The method of claim 18, wherein the virtual infrastructure platform and the physical infrastructure platform are part of a software-defined data center.

\* \* \* \* \*